US012584569B2

(12) United States Patent
Meehan

(10) Patent No.: US 12,584,569 B2
(45) Date of Patent: Mar. 24, 2026

(54) EXPANDABLE CABLE TROLLEY SYSTEM

(71) Applicant: Columbus McKinnon Corporation,
Getzville, NY (US)

(72) Inventor: James Meehan, Charlotte, NC (US)

(73) Assignee: Columbus McKinnon Corporation,
Getzville, NY (US)

( * ) Notice: Subject to any disclaimer, the term of this
patent is extended or adjusted under 35
U.S.C. 154(b) by 100 days.

(21) Appl. No.: 18/794,060

(22) Filed: Aug. 5, 2024

(65) Prior Publication Data

US 2026/0036222 A1 Feb. 5, 2026

(51) Int. Cl.
*F16L 3/01* (2006.01)

(52) U.S. Cl.
CPC ..................................... *F16L 3/01* (2013.01)

(58) Field of Classification Search
CPC ............... F16L 3/01; B61B 1/00; B61B 12/02
See application file for complete search history.

(56) References Cited

U.S. PATENT DOCUMENTS

| | | | | | |
|---|---|---|---|---|---|
| 1,133,976 | A | * | 3/1915 | Kraus | F16L 3/2235 248/68.1 |
| 2,354,919 | A | * | 8/1944 | Lockwood | F16L 3/2235 248/68.1 |
| 2,355,742 | A | * | 8/1944 | Morehouse | F16L 55/035 248/68.1 |
| 2,361,943 | A | * | 11/1944 | Issoglio | F16L 3/2235 174/157 |
| 2,362,124 | A | * | 11/1944 | Ellinwood | F16L 55/035 174/157 |
| 2,404,531 | A | * | 7/1946 | Robertson | F16L 3/2235 248/68.1 |
| 2,417,260 | A | * | 3/1947 | Morehouse | F16L 3/227 174/157 |
| 3,531,071 | A | * | 9/1970 | Kubli | F16L 3/2235 248/68.1 |

(Continued)

FOREIGN PATENT DOCUMENTS

| | | |
|---|---|---|
| CN | 103738850 A | 4/2014 |
| CN | 218102390 U | 12/2022 |
| WO | 2011098389 A2 | 8/2011 |

OTHER PUBLICATIONS

ABB Switzerland Ltd, Pma Trust™ Modular Support System For
Conduits And Cables In The Rail Industry, Issued Jun. 2021.

(Continued)

*Primary Examiner* — Muhammad Ijaz
(74) *Attorney, Agent, or Firm* — Phillips Lytle LLP;
David Principe; Sarah Grimaldi

(57) ABSTRACT

An expandable cable trolley system for supporting cables for
a hoist from a trolley configured to travel along an overhead
beam. The cable trolley system includes a first block, a
second block, and a third block with cooperating curved
slots that form openings to receive the cables. The first block
has at least one roller mounted on the top surface for
engaging with an overhead beam. The second block is
disposed below and attaches to the first block. The third
block is disposed below the second block and attaches to the
second block. The configuration of the multiple blocks
provides for an expandable system that can be formed into
multiple rows by means of one set of fasteners having
substantially the same length.

11 Claims, 4 Drawing Sheets

(56) References Cited

U.S. PATENT DOCUMENTS

| | | | | | |
|---|---|---|---|---|---|
| 3,592,427 | A | * | 7/1971 | Misuraca | F16L 3/227 |
| | | | | | 248/68.1 |
| 3,695,563 | A | * | 10/1972 | Evans | F16L 3/227 |
| | | | | | 248/68.1 |
| 3,908,962 | A | * | 9/1975 | Ross | H02G 1/02 |
| | | | | | 254/134.3 R |
| 4,706,822 | A | * | 11/1987 | Remp, Jr. | B65D 85/20 |
| | | | | | 206/443 |
| 5,941,507 | A | * | 8/1999 | Page | B65H 57/14 |
| | | | | | 254/134.3 PA |
| 5,992,802 | A | * | 11/1999 | Campbell | H02G 3/30 |
| | | | | | 248/68.1 |
| 6,561,466 | B1 | * | 5/2003 | Myers | F16L 3/221 |
| | | | | | 248/68.1 |
| 6,902,138 | B2 | * | 6/2005 | Vantouroux | F16L 3/1091 |
| | | | | | 248/68.1 |
| 7,922,012 | B2 | * | 4/2011 | Sisley | H02G 3/0406 |
| | | | | | 248/74.1 |
| 9,350,145 | B2 | * | 5/2016 | Jean | H02G 1/04 |
| 9,604,824 | B2 | | 3/2017 | McKay | |
| 10,309,553 | B1 | * | 6/2019 | Schwalbe | H02G 3/32 |
| 11,208,306 | B2 | * | 12/2021 | Bouchard | F16L 3/1218 |
| 12,228,230 | B2 | * | 2/2025 | Georgeau | F16L 3/243 |
| 2009/0218451 | A1 | * | 9/2009 | Lundborg | F16L 5/02 |
| | | | | | 248/65 |
| 2011/0253847 | A1 | * | 10/2011 | Kataoka | H02G 3/088 |
| | | | | | 248/68.1 |
| 2013/0056591 | A1 | * | 3/2013 | Mongiorgi | F16L 55/035 |
| | | | | | 248/68.1 |
| 2013/0214223 | A1 | * | 8/2013 | Jean | H02G 1/02 |
| | | | | | 254/134.5 |
| 2014/0175231 | A1 | * | 6/2014 | Cox | H02G 3/04 |
| | | | | | 248/68.1 |
| 2014/0224942 | A1 | * | 8/2014 | Railsback | F16L 3/237 |
| | | | | | 248/68.1 |
| 2014/0291455 | A1 | * | 10/2014 | Struck | F16L 57/04 |
| | | | | | 248/68.1 |
| 2015/0014509 | A1 | * | 1/2015 | McKay | F16L 3/01 |
| | | | | | 248/62 |
| 2016/0031451 | A1 | * | 2/2016 | Steger | B61B 3/00 |
| | | | | | 104/89 |
| 2019/0145551 | A1 | * | 5/2019 | Schwalbe | H02G 3/32 |
| | | | | | 248/67.5 |
| 2021/0285571 | A1 | * | 9/2021 | Taillon | F16L 3/16 |
| 2024/0396312 | A1 | * | 11/2024 | Sylvester | H02G 3/32 |

OTHER PUBLICATIONS

Shri Krishna Engineering Works, Cable Carrier Trolley.
Focus Technology Co. Ltd., C-Track Festoon System Plastic Middle Trolley For Round Cable.

* cited by examiner

EXPANDABLE CABLE TROLLEY SYSTEM

TECHNICAL FIELD

The present invention relates generally to the field of material handling systems, and more particularly to an expandable cable trolley system for conveying cables along an overhead beam.

BACKGROUND ART

Flat cable double trolleys known in the art rely on ever longer bolts to expand. What is needed is an improved modular system for a cable trolley system for conveying cables along an overhead beam.

SUMMARY OF THE INVENTION

With parenthetical reference to the corresponding parts, portions or surfaces of the disclosed embodiment, merely for the purposes of illustration and not by way of limitation, the present invention provides an expandable cable trolley system (10) for conveying a plurality of cables along an overhead beam. The system (10) includes a first block (13) having a top surface (16) and a bottom surface (22). The top surface (16) has a plurality of openings (19) defined therein. The plurality of openings (19) are configured to receive a plurality of fasteners (46). The first block (13) has one or more curved openings (25, 26, 27) defined in the bottom surface (22).

One or more rollers (34) are mounted on the first block (13).

A second block (28) is disposed below the first block (13). The second block (28) has at least one central portion (56) extending between a pair of top flanges (50, 59) and a pair of bottom flanges (53, 62). The top flanges (50, 59) have a top surface and a bottom surface disposed on a side of the top flange (50, 59) opposite from the top surface. The bottom flanges (53, 62) have a top surface and a bottom surface disposed on a side of the bottom flanges (53, 62) opposite from the top surface. The top flanges (50, 59) have a threaded opening defined therein. The bottom flanges (53, 62) have an opening defined there through. The second block (28) has a curved slot (90) extending along an arc from the back to the front of the top surface for receiving one of the plurality of cables therein. The bottom surface (110) of the second block (28) has a curved opening (101) formed therein.

A third block (31) may be disposed below the second block (28). The third block (31) has a central portion extending between a pair of top flanges and a pair of bottom flanges. The top flanges have a top surface and a bottom surface disposed on a side of the top flanges opposite from the top surface. The bottom flanges have a top surface and a bottom surface disposed on a side of the bottom flanges opposite from the top surface. The top flanges have a threaded opening defined therein. The bottom flanges have an opening defined there through. The third block has a curved slot extending along an arc from the back to the front of the top surface for receiving one of the plurality of cables therein. The bottom surface of the bottom flange has a curved opening formed therein.

The plurality of fasteners (46) are configured to be disposed through the openings (19) in the first block (13) and into the threaded openings in the top flanges (50, 59) of the second block (28).

One of the plurality of fasteners (46) is configured to be disposed through the bottom flanges of the second block (28) and into the threaded opening in the top flanges of the third block (31).

In another aspect of the invention one of the top flanges (50) extends rightward from the rear of the central portion (56) and one of the bottom flanges (53) extends rightward from the rear of the central portion (56).

In another aspect of the invention, one of the top flanges extends leftward from the front of the central portion and one of the bottom flanges extends leftward from the front of the central portion.

In yet another aspect of the invention, the one or more rollers comprise a pair of rollers configured to engage with one of the flanges of an I-beam.

Another aspect of the invention is that the plurality of fasteners have substantially the same length.

In yet another aspect of the invention, the top and bottom flanges of the second or third blocks are disposed in spaced apart relation.

In another aspect of the invention one of the plurality of fasteners fits in a space between the top and bottom flanges of the second or third blocks.

Another aspect of the invention is that the one or more curved slots in the bottom surface of the first block have a semicircular profile.

In another aspect of the invention, the one or more curved slots in the bottom surface of the second or third blocks have a semicircular profile.

In yet another aspect of the invention the one or more rollers are mounted on the top surface of the first block.

BRIEF DESCRIPTION OF THE DRAWINGS

The invention is illustrated in the drawings in which like reference characters designate the same or similar parts through the figures of which.

DESCRIPTION OF THE PREFERRED EMBODIMENTS

Figure 1:
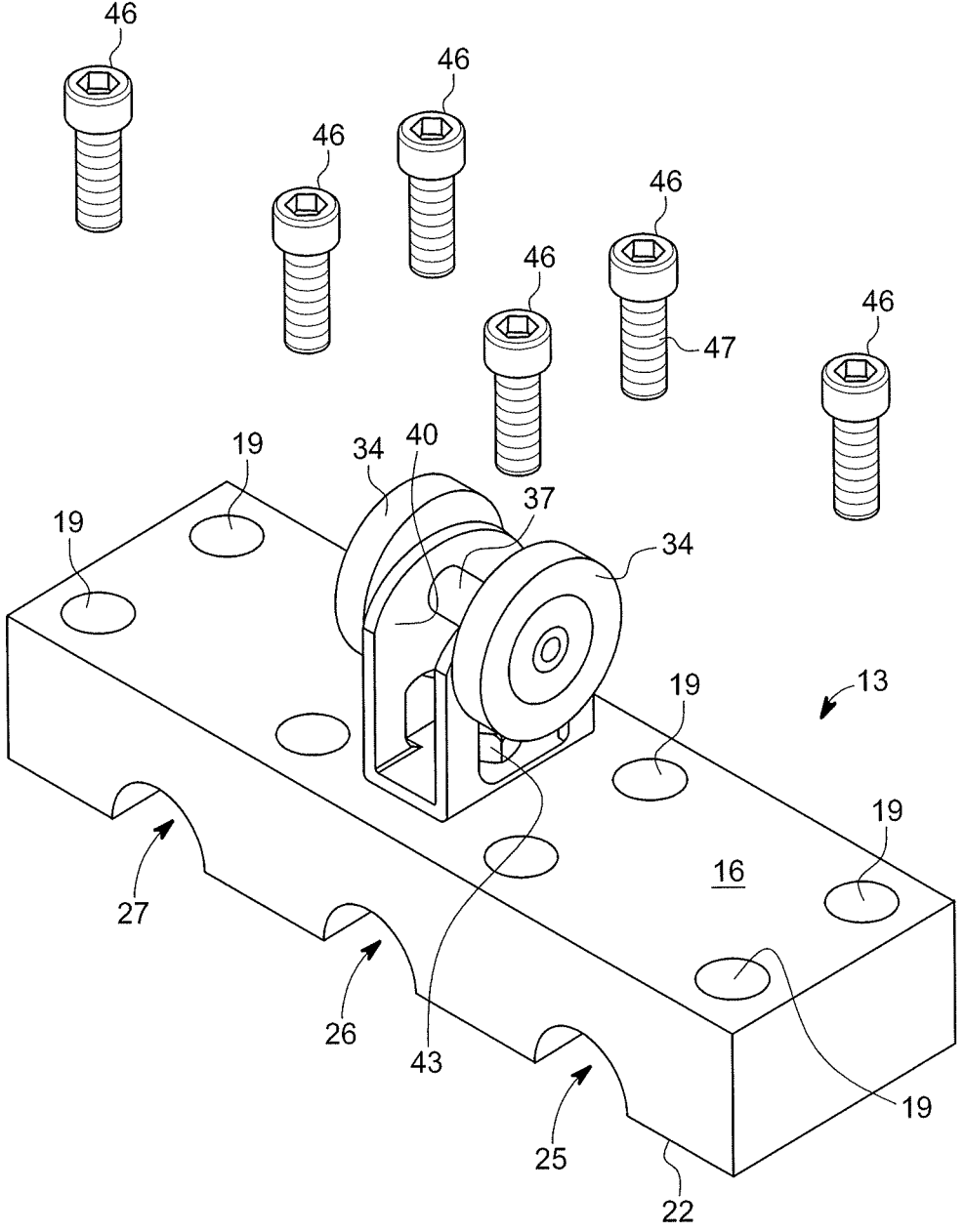
FIG. 1 is a perspective view of a first block of the expandable cable trolley system of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly"

generally refer to the orientation of a surface relative to its axis of elongation, or of rotation, as appropriate.

Figure 4:
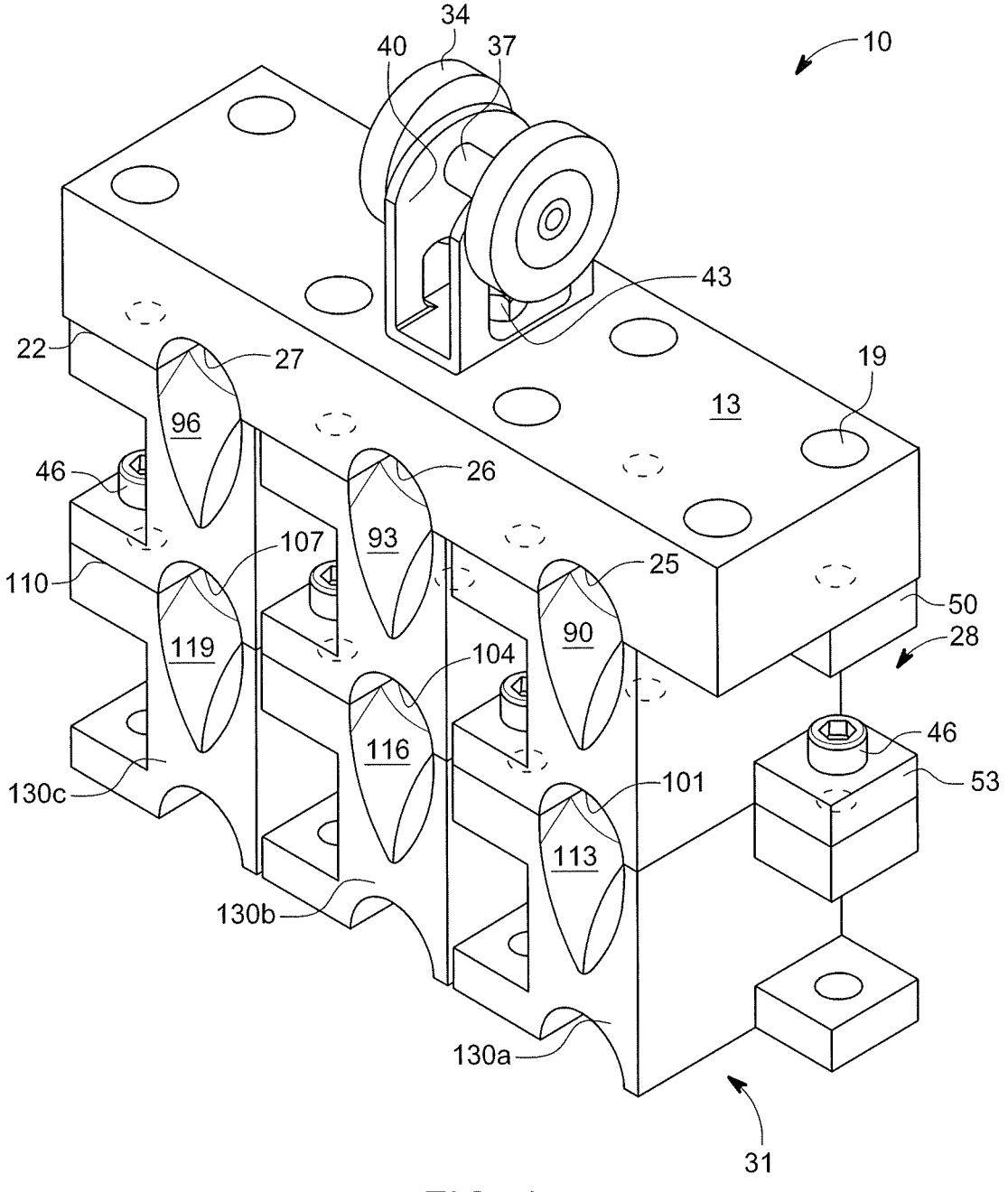
FIG. 4 is a perspective view of the expandable cable trolley system of the present invention.

Referring now to the drawings, and more particularly to FIG. 1 thereof an expandable cable trolley system 10 (best shown in FIG. 4) may include a first block 13. The first block 13 has a top surface 16 that may be substantially planar. The top surface 16 may be provided with a plurality of openings 19. The openings 19 may extend through the body of the first block 13 from the top surface 16 to a bottom surface 22. The bottom surface 22 may be provided with curved openings 25, 26, and 27. The curved openings 25 may be semi-circular as shown in the figure. The top surface 16 may be flat as shown. The U-shaped frame 40 may be attached to the top surface 16 by a fastener 43.

A pair of rollers 34 may be mounted to the first block 13. In the example shown, the rollers 34 are mounted on an axle 37 supported by a U-shaped frame 40. Other configurations for supporting rollers 34 will be evident to persons of ordinary skill in the art based on this disclosure. The rollers 34 may be configured to engage with overhead rails or flanges on an I-beam such that the cable trolley system 10 (FIG. 4) may travel along an overhead rail or beam to support a cable associated with a hoist.

Figure 2:
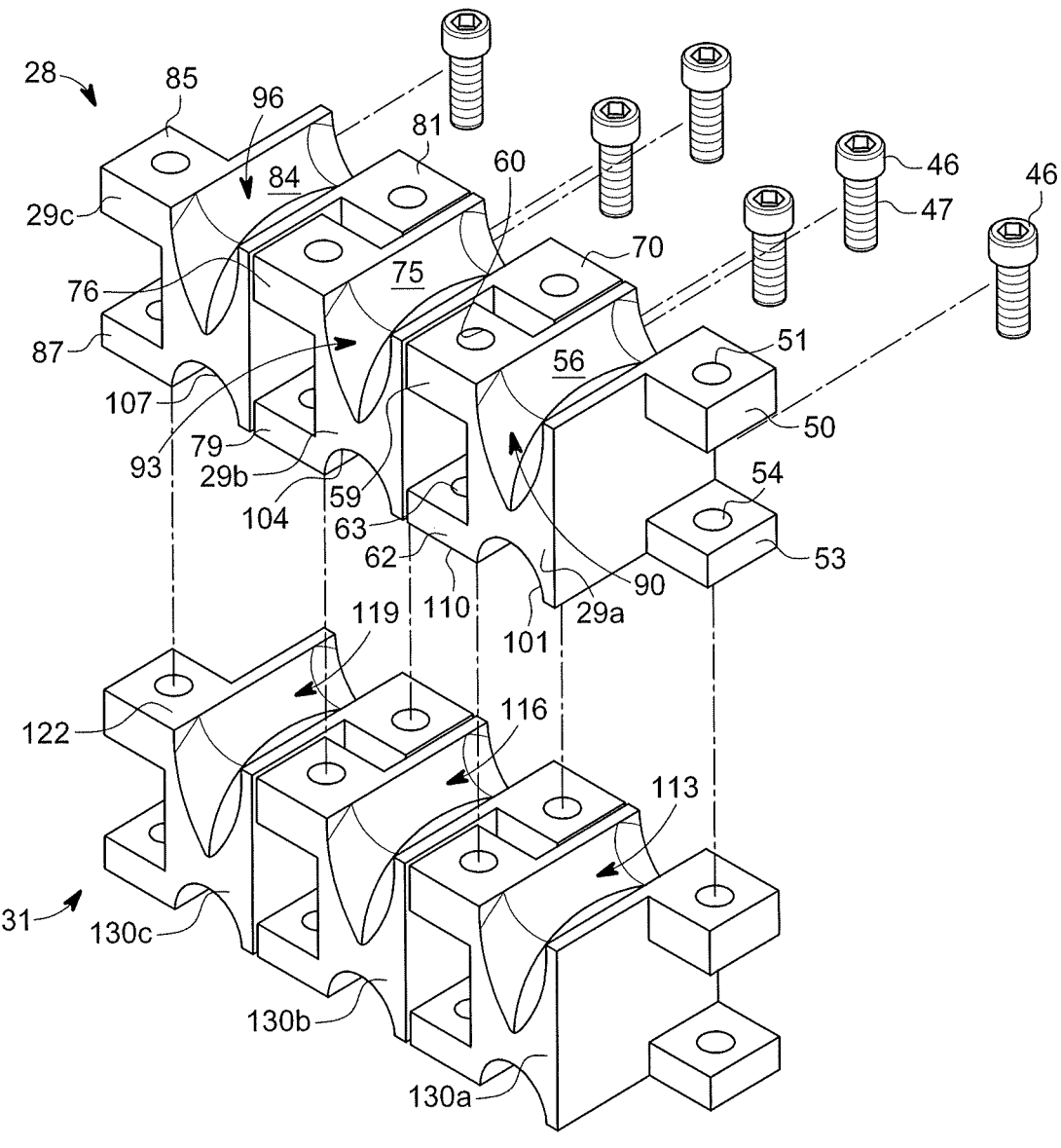
FIG. 2 is an exploded perspective view of a second and third block of the present invention.
Figure 3:
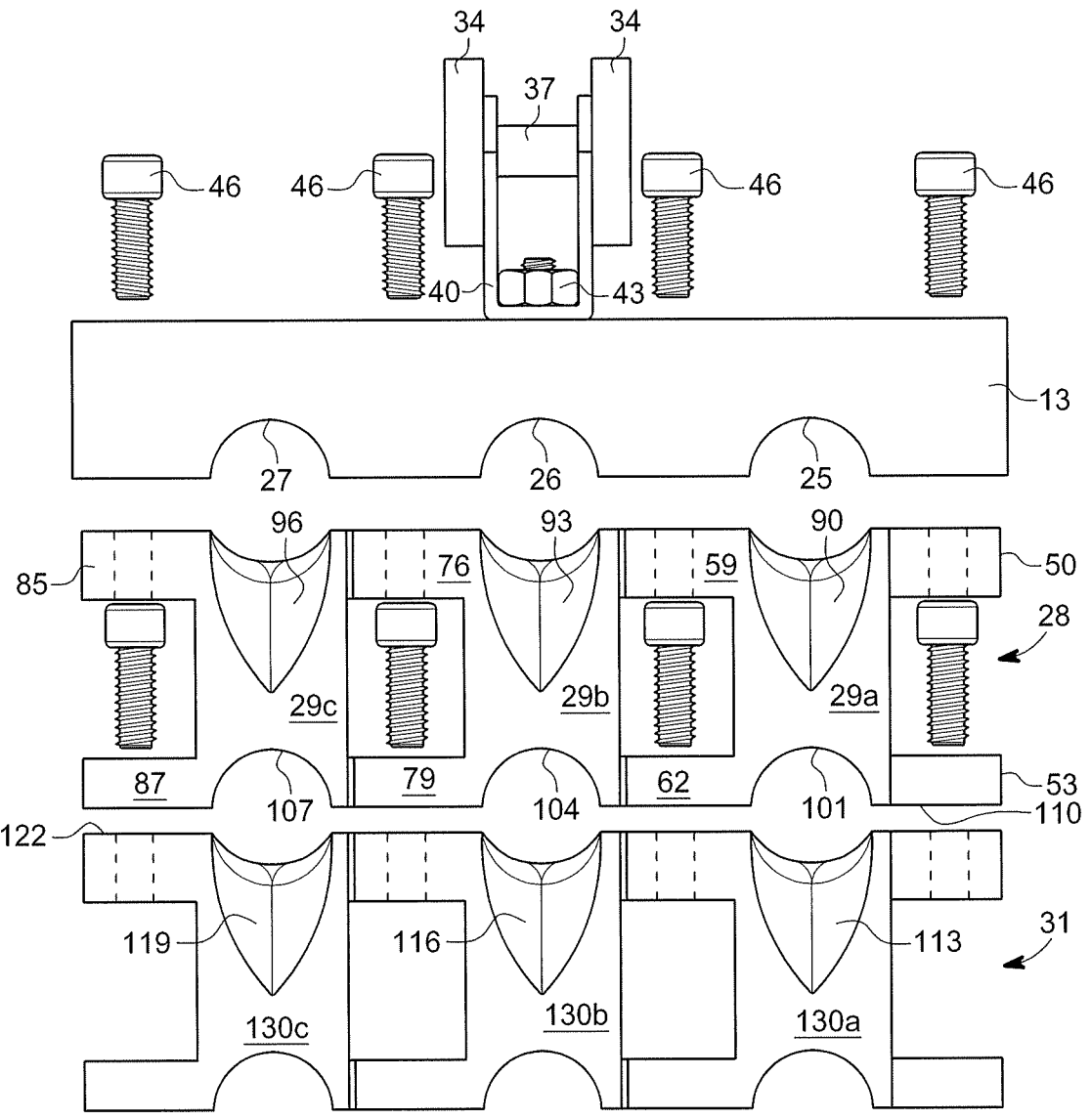
FIG. 3 is an exploded front elevational view of the expandable cable trolley system of the present invention.

As shown in FIG. 2, a second block 28 may be connected to the first block 13 and a third block 31 may be connected to the second block 28 as will be described in greater detail herein. The second block 28 may be unitary or may be constructed of separate units 29a, 29b, and 29c that are disposed side-by-side to form the second block 28. From the right hand side of the second block 28, the first unit 29a has a pair of flanges 50 and 53 extending to the right from the rear of a central portion 56. The flange 50 has a threaded opening 51 configured to receive a fastener 46 through the opening 19 in the first block 13. The flange 53 has an opening 54 (FIG. 3) that receives a fastener 46 there through. The first unit 29a has a pair of flanges 59 and 62 extending to the left from the front of the central portion 56. Flange 59 has a threaded opening 60 configured to receive a fastener 46 through the opening 19 in the first block 13. Flange 62 has an opening 63 that receives a fastener 46 there through.

Unit 29b is constructed in similar fashion with flanges 70, 73 (hidden in FIG. 2) extending to the right from the rear of a central portion 75 and flanges 76, and 79 extending from the front of a central portion 75. In this manner, the positioning of the respective flanges leaves a void space at the front or rear of the central portion configured to receive flanges from the adjacent unit. In this manner, each unit 29a-c may be connected at each of the opposite corners to the first block 13 and to the third block 31.

Unit 29c may be constructed in the same fashion with a pair of spaced apart flanges 81, 83 (hidden in FIG. 2) extending from the right rear of a central portion 84 and a pair of spaced apart flanges 85, 87 extending from the left front of the central portion 84. Units 29b and 29c may have threaded openings at the top for engaging with threads 47 on fasteners 46 and may have openings at the bottom as described above in connection with 29a As best shown in FIG. 2, each of the units 29a, 29b, and 29c has a curved slot 90, 93, 96 extended downward in an arc shape from the top surface that extends from an approximate midportion of the back of the unit 29a, b, c to an approximate midportion of the front of the unit 29a, b, c. The curved slots 90, 93, 96 in the top surface of the second block 28 combine with the curved openings 25, 26, 27 in the bottom surface 22 of the first block 13 to form a passageway for receiving a cable such as a hoist cable to be transported by the trolley along an overhead beam.

Each unit 29a, b, c, has a curved opening 101, 104, 107 on its bottom surface 110 that combines with a curved slot 113, 116, 119 extending downward along an arc from the top surface 122 of the third block 31 to form a passageway for receiving a cable such as a hoist cable to be transported by the trolley along an overhead beam.

The third block 31 may be unitary or may be constructed of separate units 130a, 130b, and 130c which may be identical to units 29a, 29b, and 29c described above.

The present invention contemplates that many changes and modifications may be made. Therefore, while the presently-preferred form of the expandable cable trolley system has been shown and described, and several modifications and alternatives discussed, persons skilled in this art will readily appreciate that various additional changes and modifications may be made without departing from the spirit of the invention, as defined and differentiated by the following claims.

What is claimed is:

1. An expandable cable trolley system for conveying a plurality of cables along an overhead beam, the system comprising:
    a first block having a top surface and a bottom surface, the top surface having a plurality of openings defined therein, the plurality of openings configured to receive a plurality of fasteners, the first block having one or more curved openings defined in the bottom surface;
    one or more rollers mounted on the first block;
    a second block disposed below the first block, the second block having at least one central portion extending between a pair of top flanges and a pair of bottom flanges, the top flanges having a top surface and a bottom surface disposed on a side of the top flange opposite from the top surface, the bottom flanges having a top surface and a bottom surface disposed on a side of the bottom flanges opposite from the top surface, the top flanges having a threaded opening defined therein; the bottom flanges having an opening defined therethrough, the second block having a curved slot extending along an arc from the back to the front of the top surface for receiving one of the plurality of cables therein, the bottom surface of the second block having a curved opening formed therein;
    a third block disposed below the second block, the third block having a central portion extending between a pair of top flanges, the top flanges having a top surface and a bottom surface disposed on a side of the top flanges opposite from the top surface, the top flanges having a threaded opening defined therein; the third block having a curved slot extending along an arc from the back to the front of the top surface receiving one of the plurality of cables therein;
    the plurality of fasteners configured to be disposed through the openings in the first block and into the threaded openings in the top flanges of the second block; and,
    one of the plurality of fasteners configured to be disposed through the bottom flanges of the second block and into the threaded opening in the top flanges of the third block.

2. The system of claim 1, wherein one of the top flanges on the second block extends rightward from the rear of the central portion and one of the bottom flanges on the second block extends rightward from the rear of the central portion.

3. The system of claim 1, wherein one of the top flanges on the second block extends leftward from the front of the central portion and one of the bottom flanges on the second block extends leftward from the front of the central portion.

4. The system of claim 1, wherein the one or more rollers comprise a pair of rollers configured to engage with one of the flanges of an I-beam.

5. The system of claim 1, wherein the plurality of fasteners have substantially the same length.

6. The system of claim 1, wherein the top and bottom flanges of the second block are disposed in spaced apart relation.

7. The system of claim 6, wherein one of the plurality of fasteners fits in a space between the top and bottom flanges of the second block.

8. The system of claim 1, wherein the one or more curved openings in the bottom surface of the first block have a semicircular profile.

9. The system of claim 1, wherein the curved opening in the bottom surface of the second block has a semicircular profile.

10. The system of claim 1, wherein the one or more rollers are mounted on the top surface of the first block.

11. An expandable trolley system for conveying a plurality of cables along an overhead beam, the system comprising:

a first block having a top surface and a bottom surface, the top surface having a plurality of openings defined therein, the plurality of openings configured to receive a plurality of fasteners, the first block having one or more curved slots defined in the bottom surface;

one or more rollers mounted on the top surface of the first block, the one or more rollers configured to engage with the overhead beam;

a second block having a central portion connecting between a top flange and a bottom flange, the top flange having a top surface and a bottom surface disposed on a side of the top flange opposite from the top surface, the bottom flange having a top surface and a bottom surface disposed on a side of the bottom flange opposite from the top surface, the top flange having a threaded opening defined therein; the bottom flange having an opening defined therethrough, the top flange having a curved slot formed in the top surface of the top flange for receiving one of the plurality of cables therein, the curved extends along an arc from a front surface to a rear surface of the second block, the bottom surface of the second block having one or more curved slots formed therein;

a third block having a central portion connecting between a top flange and a bottom flange, the top flange having a top surface and a bottom surface disposed on a side of the top flange opposite from the top surface, the bottom flange having a top surface and a bottom surface disposed on a side of the bottom flange opposite from the top surface, the top flange having a threaded opening defined therein; the bottom flange having an opening defined therethrough, the top flange having a curved slot formed in the top surface of the top flange for receiving one of the plurality of cables therein, the curved slot extends along an arc from a front surface to a rear surface of the third block, the bottom surface of the third block having one or more curved slots formed therein one of the plurality of fasteners configured to be disposed through the opening in the first block and into the threaded opening in the top flange of the second block; and, one of the plurality of fasteners configured to be disposed through the bottom flange of the second block and into the threaded opening in the top flange of the third block.

* * * * *